July 3, 1962  M. J. LILJEBERG  3,042,094
LOCKING SCREW WITH EXPANDING MEANS AT EACH END
Filed Sept. 30, 1959
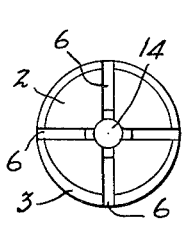
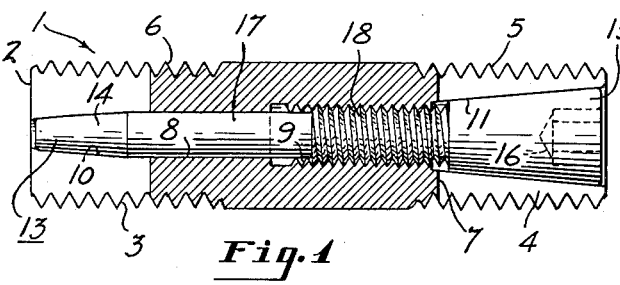
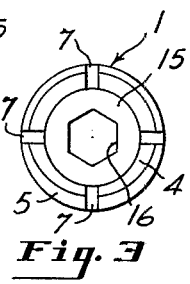
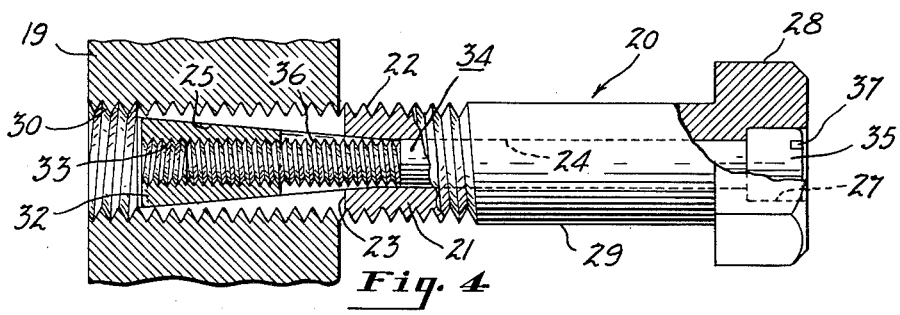
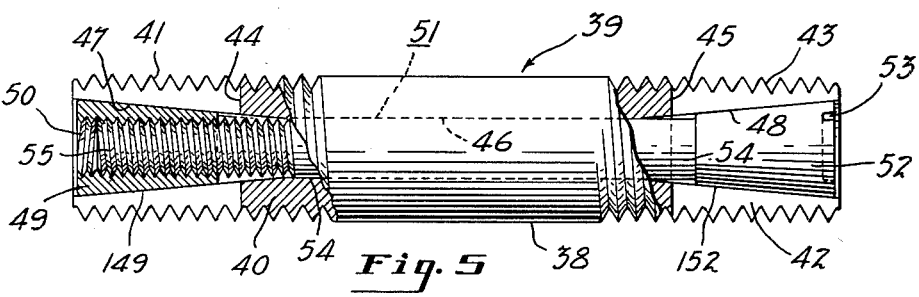
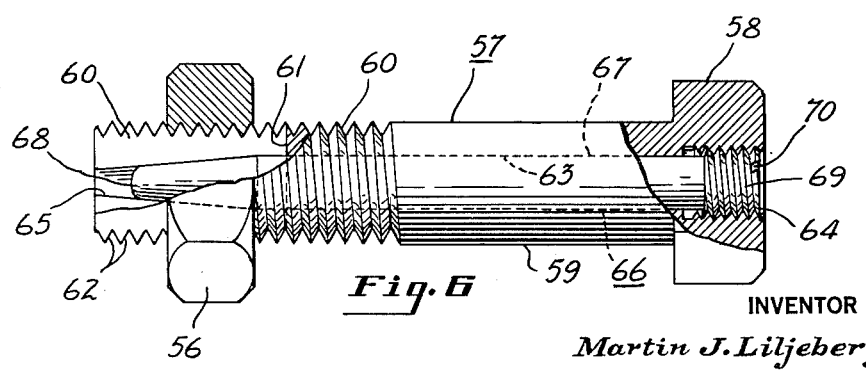
INVENTOR
Martin J. Liljeberg
BY
ATTORNEYS

United States Patent Office 3,042,094
Patented July 3, 1962

3,042,094
LOCKING SCREW WITH EXPANDING MEANS AT EACH END
Martin J. Liljeberg, 3982 W. 220 St., Fairview Park, Ohio; Elsa I. Liljeberg, executrix of said Martin J. Liljeberg, deceased
Filed Sept. 30, 1959, Ser. No. 843,465
1 Claim. (Cl. 151—31)

The present invention relates to locking means for bolts, studs or other screws and more particularly to bolt-type expanding means having tapered portions for expanding the hollow, split, externally threaded, end portion of a screw.

It has been known for more than 70 years that hollow screws could be locked in place by means of expanding members as shown, for example, in United States Patent No. 322,657 granted July 21, 1885. During this time, bolts have often been split at their ends and provided with means for expanding the threaded end of the bolt as shown, for example, in United States Patent Nos. 1,001,369 and 1,363,710. The disadvantage of such constructions was that the bolt or screw was seriously weakened by removing the metal from the interior thereof. Construction of a bolt to receive an expanding means resulted in a decrease in the tensile strength of the bolt. Previously known constructions had various other disadvantages, and the use of hollow, externally threaded bolts with internal expanding means was, therefore, very limited.

The present invention provides a screw locking means which is quite different from previously known constructions and which has several advantages not obtainable with prior constructions. The present invention provides a construction wherein the decrease in tensile strength resulting from removing metal from the bolt or screw to receive an internal expander is offset by the holding power of the expander itself which acts as a second bolt or screw adding its tensile strength to that of the main screw. The invention also provides novel studs which have externally threaded expansible portions at both ends whereby a single internal expanding means may be employed to expand both ends of the stud. The invention has various other novel features with important advantages.

An object of the present invention is to provide a simple, inexpensive, locking means for bolts, studs, or other screws.

A further object of the invention is to provide a screw having an externally threaded end portion which may be expanded radially by a tool located at the opposite end portion of the screw.

Another object of the invention is to provide a screw which may be locked securely in its assembled position and which is not weakened by the internal expanding means therefor.

Another object of the invention is to provide screws having axially spaced threaded portions which may be expanded radially by a single expanding means.

Other objects, uses and advantages of the invention will become apparent to those skilled in the art from the following description and claim and from the drawings in which:

FIGURE 1 is an axial sectional view showing a stud having locking means constructed in accordance with the present invention;

FIGURE 2 is an end view on the same scale as FIG. 1 showing one end of the stud;

FIGURE 3 is an end view on the same scale as FIG. 1 showing the opposite end of the stud;

FIGURE 4 is a fragmentary side elevational view with parts broken away and shown in section showing a bolt and locking means therefor constructed in accordance with the present invention and mounted on a threaded plate;

FIGURE 5 is a side elevational view with parts broken away and shown in section showing another modified form of screw constructed according to the present invention;

FIGURE 6 is a side elevation view with parts broken away and shown in section showing a modified form of bolt and locking means constructed according to the present invention.

Referring more particularly to the drawings which are drawn substantially to scale and wherein like parts are identified by the same numerals throughout the several views, FIGS. 1, 2 and 3 show how the present invention may be applied to a standard type of stud which has been machined to receive the novel locking means. A generally cylindrical, hollow stud 1 is provided having an axial length at least three and preferably at least four times its external diameter. The stud has a split end portion 2 with standard coarse external threads 3 which extend axially a distance substantially greater than the diameter of the screw. The opposite end portion 4 of the stud is also split and has similar coarse external threads 5 extending axially about the same distance.

The opposite end portions may be split in any suitable manner. As herein shown the end portion 2 has four narrow radial slots 6 which extend axially a distance preferably greater than the radius of the stud and usually at least half the axial length of the threads 3. The opposite end portion 4 has four similar slots 7 which preferably extend axially a distance equal to at least two-thirds the diameter of the stud and usually a distance not substantially less than the axial length of the expanding head 15.

The stud 1 is symmetrical about its axis throughout its length except for the pitch of the threads and has a cylindrical bore 8 with internal generally cylindrical coarse threads 9 coaxial with the stud. The end portion 2 is machined to provide an internal frusto-conical tapered surface 10 which gradually increases in diameter toward the bore 8 and has a maximum diameter equal to that of said bore. The opposite end portion 4 is machined to provide a smooth frusto-conical surface 11 which gradually decreases in diameter toward the bore 8 and which, like the surface 10 and the bore 8, is coaxial with the stud as shown in the drawings. The surfaces 10 and 11 preferably have a gradual taper so that a plane containing the axis of the frusto-conical surface will intersect such surface along two lines which are inclined at an angle of about 5 to 15° relative to each other. It will be noted that the slots 6 and 7 extend axially at least as far as the surfaces 10 and 11, respectively, in the studs shown herein. It will be apparent, however, that the construction may be varied considerably without losing the advantages of this invention.

Means are provided for expanding both ends of the stud 1 comprising a special bolt or expander 13 having a frusto-conical end portion 14 with the same taper as the surface 10 and an enlarged tapered end portion 15 having the same taper as the surface 11 and increasing in diameter toward the end of the stud to provide a tapered head. Said head has a conventional hexagonal socket whereby the expander 13 may easily be tightened by a suitable tool. The expander has an intermediate cylindrical portion 17 of substantially the same diameter as the bore 8 and a generally cylindrical threaded portion 18 of a size to screw into the threads 9. The tapered end portions 14 and 15 of the expander 13 are spaced apart so that their external frusto-conical surfaces can engage the complementary surfaces 10 and 11 simultaneously and can expand the end portions 2 and 4 simultaneously as the expander 13 is rotated and tightened.

It will be noted that the tensile strength of the expander 13 is added to the tensile strength of the end portion 4 of the stud to offset the reduction in strength of the stud due to hollowing out of the stud. The construction of the stud 1 also has the advantage that the internal machining operations are extremely simple and can be performed at minimum cost. The expander 13 can also be made at a very low cost.

The hexagonal socket 16 is usually preferred for the expanders of the present invention and may be used in each of the species of the invention shown in the drawings. However, for convenience, screwdriver slots have been illustrated in the other forms of the invention, it being understood that the shape of the tool-receiving opening forms no part of the present invention.

It is preferable to construct the expander for the bolt, stud or other screw so that such expander serves as an auxiliary bolt and adds its tensile strength to that of the main screw so as to compensate for the removal of material from such screw necessary to receive the expander. The forms of the invention shown in FIGS. 4 and 5 are constructed in this manner, the screw 20 of FIG. 4 having a holding means in the form of an enlarged hexagonal nut 28 while the screw 39 of FIG. 5 employs a different type of holding means in the form of external threads 43. The heads 35 and 52 of the different expanders shown in FIGS. 4 and 5 are also considerably different in construction, but it will be apparent that such heads also serve as holding means so that the expander may be subjected to tensile stresses between its opposite ends.

FIGURE 4 shows a flat metal plate 19 having generally cylindrical internal threads 30 which are usually standard coarse threads. A generally cylindrical bolt 20 is shown having a split end portion 21 with external threads 22 of a size to fit the threads 30. The end portion 21 is provided with regularly circumferentially spaced narrow slots 23 to facilitate radial expansion. The bolt has a coaxial cylindrical bore 24 and a coaxial frusto-conical internal surface 25 which gradually increases in diameter in a direction away from said bore. A counterbore 27 is provided at the opposite end of the bolt within the enlarged hexagonal head 28 which projects radially outwardly from the intermediate cylindrical portion 29 of the bolt.

A straight-knurled hollow expander sleeve 32 is provided which has the same taper as the surface 25 so as to fit against said surface as shown in FIG. 4. The sleeve has generally cylindrical internal threads 33 for receiving a conventional cap screw as herein shown. A cap screw 34 is provided having an enlarged head 35 at one end and external threads at its opposite end of a size to fit the internal threads 33 of the expander sleeve. A suitable tool receiving recess may be provided in the head 35 to provide means for turning the cap screw and for drawing the sleeve 32 toward the head 35 to expand the end portion 21. A straight slot 37 is shown herein for convenience. It will be understood that such slot has a length corresponding to the diameter of the head 35 and is adapted to receive a screwdriver or other suitable tool. It will be apparent that the cap screw 34 cooperates with the bolt 20 to resist axial stretching of said bolt so as to compensate for the removal of metal from the interior of the bolt.

FIGURE 5 shows a form of the invention somewhat similar to the form shown in FIG. 4 but applied to a stud 39 and having means for expanding both ends of the stud. It will be apparent, however, that the construction shown in FIG. 4 may also be employed to improve a standard type stud. The stud 39 of FIG. 5 is constructed to obtain the maximum advantages of the present invention including advantages which could not be obtained with bolts having conventional heads similar to the head 28. This stud has an end portion 40 with external coarse threads 41 of uniform diameter, an opposite end portion 42 with similar external threads 43, and an externally cylindrical intermediate portion 38 extending between said end portions. The end portions 40 and 42 have regularly circumferentially spaced slots 44 and 45, respectively, similar to the slots 6 and 7, which extend axially a distance greater than the external diameter of the stud and greater than the axial length of the expanding members 49 and 52 as indicated in FIG. 5, which is drawn to scale to facilitate an understanding of the invention. The threads 41 and 43 each extend axially a distance greater than the external diameter of the stud which distance is shown herein as about 1½ times said diameter.

The stud has a coaxial cylindrical bore 46 which merges at one end with a smooth internal frusto-conical surface 47 and at the opposite end with a similar smooth frusto-conical internal surface 48, said frusto-conical surfaces gradually increasing in diameter in a direction away from the bore 46. The tapers of the surfaces of revolution 47 and 48, like those of the surfaces 10, 11, 25 and 65, are gradually tapered and are preferably such that a plane containing the axis of such surfaces will intersect each of such surfaces along two lines inclined relative to each other at an angle of about 5 to 15°. The surfaces 47 and 48 preferably extend axially a distance greater than the external diameter of the stud and preferably extend axially inwardly beyond the slots 44 and 45 as shown in FIG. 5, but it will be apparent that the construction can be changed without losing all of the advantages of this invention.

A tapered expander sleeve 49 is provided which is similar to the sleeve 32 described above. Such sleeve has an external straight-knurled frusto-conical surface 149 with the same taper as the surface 47 adapted to engage the surface 47 prior to deformation thereof substantially throughout the length of the sleeve. Such length is preferably at least two-thirds the external diameter of the stud 39 and its intermediate cylindrical portion 54. As herein shown, said length is not substantially less than the external diameter of the stud and the sleeve 49 is constructed so that it can be drawn entirely within the stud before exerting substantial expanding force to the end portion 40. The expander sleeve 49 has an internal coarse thread 50 of uniform diameter coaxial with the stud 39 which extends the full length of the sleeve to receive a male expander bolt 51.

The female expander sleeves 32 and 49 are preferably provided with means for resisting rotation relative to the bolt or stud in which they are used. Such sleeves are preferably made of steel or other metal or a strong, hard material such as nylon or the like, but deformable materials such as rubber-like materials could also be used. The sleeves 32 and 49 may be non-circular so as to resist rotation. It is usually preferable to provide these expanders with straight-knurled frusto-conical external surfaces having axially extending ridges. However, there are other roughened surfaces which will resist rotation when the expander bolt is rotated and which can be used in practicing this invention.

The bolt 51 has a tapered head 52 with a smooth frusto-conical external surface of revolution 152 having the same taper as the internal surface 48. The head also has a straight tool-receiving slot 53 extending between diametrically opposed points on the circumference of the head. The bolt 51 has an elongated intermediate cylindrical portion 54 with an axial length many times its diameter and has a threaded end portion 55 of a size to fit the threads 50 of the expander sleeve. The threads of the end portion 55 extend axially a distance substantially greater than the axial length of the sleeve 49 and are located so that the sleeve 49 and the head 52 are in engagement with the surfaces 47 and 48 before the sleeve reaches the end of the threads, whereby both ends of the stud 39 may be expanded radially when the bolt 51 is rotated and subjected to tensile stresses. The diameter of the bore 46 is preferably substantially the same as that of the intermediate portion 54 so that the bolt 51 has maximum tensile strength. The diameter of the bore 46 is preferably no more than the radius of the stud 39 and its intermediate portion 38 so that the stud is not weakened excessively and so that the end portions of the stud function in the most efficient manner.

The surface 152 preferably engages the surface 48 substantially throughout the axial length of the head 52 and such length is preferably not substantially less than the diameter of the stud 39. The head 52 is also preferably of a size to fit within the stud as indicated in FIG. 5 before the end portion 42 is expanded.

FIGURE 6 shows another novel construction which has distinct advantages even though the expanding means does not add to the tensile strength of the main bolt. This figure shows a conventional hexagonal nut 56 and a generally cylindrical bolt 57 having a conventional hexagonal head 58, a cylindrical intermediate portion 59, and a threaded end portion 60 of uniform diameter. The end portion has regularly circumferentially spaced narrow slots 61 and generally cylindrical external coarse threads 62 of a size to fit the internal threads of the nut 56. The bolt is provided with a coaxial cylindrical bore 63 which terminates at one end in generally cylindrical internal coarse threads 64 and at its opposite end in a smooth frusto-conical surface 65 which gradually decreases in diameter in a direction away from said bore.

A male expander 66 is provided having an elongated cylindrical shank 67 of the same diameter as the bore 63 and a tapered end portion 68 of a size to fit against the surface 65 as shown in FIG. 6 which is drawn to scale. The expander 66 is provided with a threaded end portion 69 of a size to fit the threads 64 and preferably having an axial length less than that of the threads 64. Said end portion is provided with a slot 70, similar to the slots 37 and 53, for receiving a screwdriver or similar tool. It will be noted that the external diameter of the shank 67 is no greater than the internal diameter of the threads 64 to permit assembly. Likewise, the diameter of the cylindrical portion 17 is no greater than the internal diameter of the threads 9. The drawings have been drawn to scale so that such features will be disclosed clearly by the drawings alone.

The end portion 69 is preferably spaced from the opposite end portion 68 at such a distance that the end portion 69 will be entirely within the bolt when the expander 66 is tightened to lock the end portion 60 against the nut 56. It is possible to lock the nut in place even though it is located in an inaccessible location. The gradual taper of the surface 65 permits expanding the metal against all of the threads of the nut 56 so as to effectively resist rotation of the nut while at the same time avoiding damage to the threads of the nut. It is thus possible to release the nut and to remove the bolt 57 with relative ease if such removal were desirable. This does not detract from the effectiveness of the locking means. The locking means shown in the other species of the invention may also be released in a similar manner.

Having described my invention, I claim:

In combination, a hollow generally cylindrical stud having end portions which are split circumferentially to facilitate expansion, and an axially elongated expander fitting within said stud and having means for expanding both of said end portions simultaneously; each of said end portions having external threads extending axially a distance at least equal to the external diameter of the stud, said stud having an axial length at least three times said diameter and having a slot at each end thereof extending axially a distance which is at least half the axial length of the adjacent external threads, said stud having a machined internal surface providing a passage through the stud including internal threads between the end portions of the stud and frusto-conical internal surfaces on opposite sides of said last-named threads, said frusto-conical surfaces gradually decreasing in diameter toward the same end of the stud; said expander having a machined external surface of a size to fit said machined internal surface including external threads engaging said internal threads and frusto-conical external surfaces on opposite sides of said last-named external threads for engaging said frusto-conical internal surfaces, said frusto-conical external surfaces being part of said first-named means.

References Cited in the file of this patent

UNITED STATES PATENTS

| | | |
|---|---|---|
| 990,065 | Sargeant | Apr. 18, 1911 |
| 2,071,363 | Shannon | Feb. 23, 1937 |
| 2,479,075 | Martin | Aug. 16, 1949 |
| 2,727,276 | Nelson | Dec. 20, 1955 |

FOREIGN PATENTS

| | | |
|---|---|---|
| 739,089 | France | Oct. 24, 1932 |
| 457,893 | Italy | June 12, 1950 |